(12) United States Patent
Watanabe et al.

(10) Patent No.: US 7,776,992 B2
(45) Date of Patent: Aug. 17, 2010

(54) POLYCHLOROPRENE LATEX COMPOSITION AND PROCESS FOR PRODUCING THE SAME

(75) Inventors: Kosuke Watanabe, Niigata (JP); Motohiro Ose, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 936 days.

(21) Appl. No.: 10/556,720

(22) PCT Filed: May 12, 2004

(86) PCT No.: PCT/JP2004/006714

§ 371 (c)(1),
(2), (4) Date: Nov. 14, 2005

(87) PCT Pub. No.: WO2004/101670

PCT Pub. Date: Nov. 25, 2004

(65) Prior Publication Data

US 2007/0072983 A1 Mar. 29, 2007

(30) Foreign Application Priority Data

May 14, 2003 (JP) ............... 2003-136182
May 22, 2003 (JP) ............... 2003-144332
Apr. 16, 2004 (JP) ............... 2004-121135

(51) Int. Cl.
*C08L 11/02* (2006.01)
*C08F 2/30* (2006.01)
*C09D 111/02* (2006.01)
*C09J 111/02* (2006.01)

(52) U.S. Cl. .............. 528/198; 524/377

(58) Field of Classification Search ............ 528/198; 524/377
See application file for complete search history.

(56) References Cited

U.S. PATENT DOCUMENTS 4,029,625 A 6/1977 Denda et al.

FOREIGN PATENT DOCUMENTS

| EP | 0 648 788 A1 | | 4/1995 |
|---|---|---|---|
| EP | 648788 A1 | * | 4/1995 |
| GB | 2 125 420 A | | 3/1984 |
| GB | 2125420 A | * | 3/1984 |
| JP | 11-335491 | | 12/1999 |
| JP | 11335491 A | * | 12/1999 |
| JP | 2000-303043 | | 10/2000 |
| JP | 2001-49043 | | 2/2001 |
| JP | 2002-53703 | | 2/2002 |
| JP | 2002053703 A | * | 2/2002 |
| JP | 2003-55627 | | 2/2003 |
| JP | 2003-136182 | | 5/2003 |
| JP | 2003-144332 | | 5/2003 |
| JP | 2004-109691 | | 4/2004 |
| JP | 2004-121135 | | 4/2004 |

OTHER PUBLICATIONS

Translation to Yashima et al. (JP 2002053703) (2002).*
"Adhesion Technology", vol. 21, No. 4, pp. 17, 2.2.2.2., Serial No. 65, 2002.
Yoshida Tokiyuki et al., "New Edition Surfactant Handbook", Kougakutosho Ltd., pp. 234, 2000.
JIS K6387-2, 2003 (with partial English Translation).

* cited by examiner

*Primary Examiner*—Kelechi C Egwim
(74) *Attorney, Agent, or Firm*—Oblon, Spivak, McClelland, Maier & Neustadt, L.L.P.

(57) ABSTRACT

A polychloroprene latex composition which has a low viscosity and which can be made to have a high solid content, obtained by emulsion polymerization of chloroprene alone or chloroprene and a monomer copolymerizable with chloroprene in the presence of a polyvinyl alcohol and a nonionic emulsifier, such as polyoxyethylene alkyl ether.

19 Claims, No Drawings

US 7,776,992 B2

POLYCHLOROPRENE LATEX COMPOSITION AND PROCESS FOR PRODUCING THE SAME

TECHNICAL FIELD

The present invention relates to a nonionic polychloroprene latex composition having a low viscosity. Such a polychloroprene latex composition has a low viscosity, even though it is a nonionic type, and thereby has such advantages that it is useful also for spray coating, a high solid content is likely to be achieved, etc., and is suitable as a material for an aqueous adhesive.

BACKGROUND ART

As a polychloroprene latex composition, an anionic latex employing resin acid as an emulsifier has been well known. However, an anionic latex employing resin acid has a drawback in chemical and mechanical stability when used as a material for an aqueous adhesive. As a means of improving this point, an anionic latex employing a special sulfonate as an emulsifier has been known, but as the latex is acidic, there are such problems that a pH decrease is significant, and a metal may be eroded (e.g. "Adhesion Technology" vol. 21, No. 4 (2002) Serial Number 65 (p. 17, 2.2.2.2)).

In order to solve such problems, a nonionic polychloroprene latex composition employing a polyvinyl alcohol as an emulsifier/a dispersant has been proposed. However, since such a latex itself has a high viscosity, there are such problems that the coating method is limited, and it is difficult to achieve a high solid content by concentration (JP-A-2000-303043 (Claims 1 and 2, Examples 1 to 6), JP-A-2002-53703 (Claims 1 and 2, Examples 1 to 6)).

DISCLOSURE OF THE INVENTION

Under these circumstances, the present invention is to provide a nonionic polychloroprene latex composition excellent in chemical and mechanical stability, having a pH stable in the vicinity of a neutral pH and having a low viscosity, and its production method.

Further, it is to provide a nonionic polychloroprene latex composition having, as a secondary effect by making the composition have a low viscosity, a high solid content i.e. a high solid content concentration.

The present inventors have conducted extensive studies to achieve the above objects and as a result, found that a nonionic polychloroprene latex composition excellent in chemical and mechanical stability, with a small decrease of pH, and having a low viscosity, can be obtained by emulsion polymerization of chloroprene alone or chloroprene and a monomer copolymerizable with chloroprene in the presence of a polyvinyl alcohol and a nonionic emulsifier. The present invention has been accomplished on the basis of this discovery.

Namely, the present invention provides the following:

(1) A polychloroprene latex composition obtained by emulsion polymerization of chloroprene alone or chloroprene and a monomer copolymerizable with chloroprene, in the presence of a polyvinyl alcohol and a nonionic emulsifier.

(2) The polychloroprene latex composition according to the above (1), wherein the nonionic emulsifier is a polyoxyethylene alkyl ether.

(3) The polychloroprene latex composition according to the above (1), wherein the nonionic emulsifier is a polyoxyethylene-acetylene glycol ether represented by the formula (1):

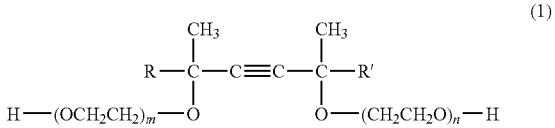

(wherein each of R and R' is an alkyl group or an aryl group, and each of m and n is an integer).

(4) The polychloroprene latex composition according to any one of the above (1) to (3), wherein the nonionic emulsifier has a HLB value of from 14 to 19.

(5) The polychloroprene latex composition according to any one of the above (1) to (4), wherein the monomer copolymerizable with chloroprene, is an ethylenically unsaturated carboxylic acid.

(6) The polychloroprene latex composition according to any one of the above (1) to (5), wherein the polyvinyl alcohol is one having a saponification degree of from 60 to 98 mol %.

(7) The polychloroprene latex composition according to any one of the above (1) to (6), wherein the total amount of the polyvinyl alcohol and the nonionic emulsifier is from 1 to 10 parts by mass, per 100 parts by mass of chloroprene alone, or the total amount of chloroprene and the monomer copolymerizable with chloroprene, and the ratio (mass ratio) of the polyvinyl alcohol/the nonionic emulsifier is within a range of from 0.5/99.5 to 99.5/0.5.

(8) The polychloroprene latex composition according to any one of the above (1) to (7), which has a solid content concentration of from 45 to 75 mass %.

(9) The polychloroprene latex composition according to the above (8), which has a pH of from 6 to 9, and a viscosity of from 5 to 5,000 mPa·s.

(10) An adhesive employing the polychloroprene latex composition as defined in any one of the above (1) to (9).

(11) The adhesive according to the above (10), wherein the gel content (toluene-insoluble matter) of a (co)polymer contained in the polychloroprene latex composition is from 3 to 30 mass %.

(12) A coating agent employing the polychloroprene latex composition as defined in any one of the above (1) to (9).

(13) A method for producing a polychloroprene latex composition, which comprises emulsion polymerization of chloroprene alone, or chloroprene and a monomer copolymerizable with chloroprene, in the presence of a polyvinyl alcohol and a nonionic emulsifier.

EFFECTS OF THE INVENTION

The polychloroprene latex composition obtainable by the present invention has a low viscosity as compared with a conventional nonionic polychloroprene latex composition obtained by emulsion polymerization employing a polyvinyl alcohol alone. Accordingly, a method of coating it is not limited, and it can be made to have a high solid content. Accordingly, it is very suitable as a material for an aqueous adhesive.

BEST MODE FOR CARRYING OUT THE INVENTION

Now, the present invention will be explained in detail below. The chloroprene of the present invention is 2-chloro-1,3-butadiene obtainable via acetylene or butadiene.

The monomer copolymerizable with chloroprene of the present invention may, for example, be 2,3-dichloro-1,3-butadiene, 1-chloro-1,3-butadiene, butadiene, isoprene, styrene, acrylonitrile, acrylic acid or its ester, or methacrylic acid or its ester, and two or more of them may be used as the case requires.

Particularly, copolymerization of an unsaturated carboxylic acid represented by acrylic acid, methacrylic acid, maleic acid or fumaric acid is preferred in view of improvement of adhesive force and emulsion stability during emulsion polymerization. Particularly, copolymerization of an ethylenically unsaturated carboxylic acid such as methacrylic acid is preferred in view of copolymerizability with chloroprene.

The amount of the monomer copolymerizable with chloroprene is not particularly limited. It is preferably at most 50 parts by mass, particularly preferably from 0.5 to 20 parts by mass, per 100 parts by mass of chloroprene, with a view to maintaining characteristics of the polychloroprene.

Particularly when an unsaturated carboxylic acid is copolymerized, its amount is preferably at most 10 parts by mass, more preferably from 0.2 to 5 parts by mass, furthermore preferably from 0.5 to 3.5 parts by mass, particularly preferably from 0.7 to 2.0 parts by mass, per 100 parts by mass of chloroprene. If the amount of the unsaturated carboxylic acid is too small, its contribution to adhesive force may be insufficient, and if it is too large, the emulsified state may be unstable.

The polyvinyl alcohol in the present invention is not particularly limited. Preferred is one having a saponification degree of from 60 to 98 mol %, more preferred is one having a saponification degree of from 75 to 95 mol %, and more preferred is one having a saponification degree of from 75 to 90 mol %.

The degree of polymerization of the polyvinyl alcohol is preferably from 200 to 3,000, more preferably from 200 to 700.

When the polyvinyl alcohol has a degree of polymerization within this range, polymerization operation can be stably carried out, and a chemically and mechanically stable polychloroprene latex composition can be obtained at a high concentration.

Further, as the case requires, a polyvinyl alcohol having another monomer copolymerized may also be used. As an example of the copolymer, a copolymer with acrylamide may be mentioned.

The nonionic emulsifier in the present invention is not particularly limited, and it may, for example, be a polyoxyethylene alkyl ether, a polyoxyethylene alkyl aryl ether, a polyoxyethylene styryl phenyl ether, a polyoxyethylene alkyl phenyl ether, a polyoxyalkylene alkyl ether, a polyoxyethylene-acetylene glycol ether or a sorbitan fatty acid ester.

Among such nonionic emulsifiers, a polyoxyethylene alkyl ether is suitably used. The polyoxyethylene alkyl ether may, for example, be preferably a polyoxyethylene lauryl ether, a polyoxyethylene cetyl ether, a polyoxyethylene stearyl ether, a polyoxyethylene higher alcohol ether, a polyoxyethylene myristyl ether or a mixture thereof, but is not limited thereto.

Further, a polyoxyethylene-acetylene glycol ether represented by the formula (1) is also suitably employed. The polyoxyethylene-acetylene glycol ether may, for example, be one obtained by adding ethylene oxide to 2,4,7,9-tetramethyl-5-decyn-4,7-diol. In the formula (1), values m and n can be changed by changing the proportion of ethylene oxide added. Practically, the values m and n are controlled as values with a certain distribution, and thus the addition amount (m+n) of ethylene oxide is usually represented as an average.

If the production cost is not considered, it is possible to accurately control the values m and n, and such a product may also be used for the present invention:

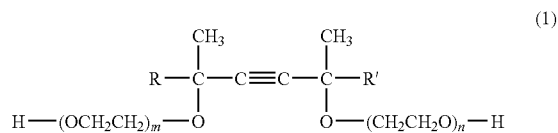

wherein each of R and R' is an alkyl group preferably having from 1 to 10 carbon atoms or an aryl group, and each of m and n is an integer of preferably from 1 to 50.

The HLB value of the nonionic emulsifier of the present invention is preferably at least 14, more preferably from 15 to 19.5, furthermore preferably from 16 to 19. If the HLB value is small, the chloroprene latex composition tends to be poor in stability, and deposits may form during the polymerization. The HLB value is a numerical value representing the balance between hydrophilic groups and lipophilic groups in an emulsifier (e.g. "New Edition Surfactant Handbook 2000", Tokiyuki Yoshida et al, Kougakutosho. Ltd., p. 234).

The total amount of the polyvinyl alcohol and the nonionic emulsifier in the present invention is not particularly limited. It is preferably from 1 to 10 parts by mass, more preferably from 2 to 6 parts by mass, furthermore preferably from 3 to 5 parts by mass, per 100 parts by mass of chloroprene alone or the total amount of chloroprene and the monomer copolymerizable with chloroprene. If the total amount of the polyvinyl alcohol and the nonionic emulsifier is less than 1 part by mass, the emulsification power tends to be insufficient, and agglomerates are likely to form frequently during the polymerization reaction. Further, if it exceeds 10 parts by mass, production may be difficult due to abnormal heat generation or thickening during the polymerization reaction, or the adhesive properties may significantly be impaired.

The ratio of the polyvinyl alcohol to the nonionic emulsifier is not particularly limited. The mass ratio of the polyvinyl alcohol/the nonionic emulsifier is preferably from 0.5/99.5 to 99.5/0.5, more preferably from 50/50 to 1/99, furthermore preferably from 30/70 to 5/95. If the above ratio is too high, water resistance may decrease, or thickening may occur during the polymerization reaction, thus making the production difficult. Further, if the above ratio is too small, emulsification power may be insufficient, and agglomerates are likely to form frequently during the polymerization reaction.

In the present invention, a chain transfer agent may be added at the time of the emulsion polymerization to adjust the content of a gel which is a polymer insoluble in toluene or the molecular weight of the polychloroprene. The chain transfer agent is not particularly limited, and one usually used for emulsion polymerization of chloroprene may be used. It may, for example, be a long chain alkyl mercaptan such as n-dodecyl mercaptan or tert-dodecyl mercaptan, a dialkyl xanthogen disulfide such as diisopropyl xanthogen disulfide or diethyl xanthogen disulfide, or iodoform.

In the present invention, the temperature at which chloroprene alone or chloroprene and the monomer copolymerizable with chloroprene are polymerized in production of a polychloroprene latex composition is not particularly limited. It is preferably from 0 to 55° C., more preferably from 10 to 50° C., so that the polymerization reaction will smoothly proceed. If the polymerization temperature is lower than 0° C., water may freeze, and if it is higher than 55° C., chloroprene tends to volatilize in a large amount, and a countermeasure against it will be required.

As a polymerization initiator, a persulfate such as potassium persulfate, an organic peroxide such as tert-butylhydroperoxide may, for example, be suitably used, but the initiator is not limited thereto.

In a case where the polymerization temperature is set to 20° C. or below, it is preferred to use sodium sulfite, ferrous sulfate, sodium anthraquinone-β-sulfonate, Rongalite, ascorbic acid, formamidinesulfinic acid or the like in combination in the form of a so-called redox initiator, whereby polymerization will smoothly proceed.

The final degree of polymerization of the polychloroprene latex composition of the present invention is not particularly limited and can optionally be adjusted. For that purpose, a polymerization terminator (polymerization inhibitor) may be used to terminate the polymerization. The polymerization terminator is not particularly limited, and a common polymerization terminator may be used, such as 2,6-tert-butyl-4-methylphenol, phenothiazine or hydroxylamine.

On that occasion, an unreacted monomer is removed by monomer removal operation, and its method is not particularly limited.

Further, the solid content concentration (sometimes referred to simply as solid content) of the polychloroprene latex composition of the present invention is not particularly limited, and the solid content concentration can be controlled to a necessary concentration by concentration or dilution by addition of water or the like. The solid content concentration in the present invention may be determined also by a method in accordance with JIS K6387-2.

Considering use of the composition as an adhesive, the solid content concentration is preferably at least 45 mass %, more preferably at least 50 mass %, furthermore preferably at least 55 mass %, in view of drying rate. However, if the solid content is 75 mass % or higher, stability may be impaired practically. Particularly, the polychloroprene latex composition of the present invention has a low viscosity as compared with a conventional nonionic latex and therefore it has such an advantage that it is easily made to have a high solid content. Accordingly, it is preferred to increase the solid content by concentration.

The concentration method may, for example, be vacuum concentration, but it is not particularly limited. In general, it is economical to carry out the operation of the monomer removal to the concentration continuously by heating under reduced pressure.

The structure of the polychloroprene latex composition of the present invention is not particularly limited, and it is possible to adjust the solid content concentration, the molecular weight of toluene-soluble matter, the toluene-insoluble matter (gel content), etc. by appropriately selecting or controlling the polymerization temperature, the polymerization initiator, the chain transfer agent, the polymer terminator, the final degree of polymerization, the monomer removal, the concentration conditions, etc.

When the initial adhesive power is emphasized, it is preferred to adjust the gel content (toluene-insoluble matter) of the (co)polymer in the polychloroprene latex composition to from 3 to 30 mass %, and when the heat resistant adhesive force is emphasized, it is preferred to adjust the gel content to from 30 to 70 mass %.

In a case where an unsaturated carboxylic acid is used as the monomer copolymerized with chloroprene for the polychloroprene latex composition of the present invention, the latex immediately after the polymerization is acidic, but it can be adjusted by e.g. a pH adjustor. pH is adjusted to preferably from 6 to 9, particularly preferably from 6.5 to 8.0, in view of stability of the latex.

The pH adjustor may, for example, be an inorganic salt such as sodium carbonate, potassium carbonate, trisodium phosphate, disodium hydrogen phosphate, tripotassium phosphate, dipotassium hydrogen phosphate, tripotassium citrate, dipotassium hydrogen citrate, trisodium citrate, disodium hydrogen citrate, sodium acetate, potassium acetate or sodium tetraborate, or a basic substance such as sodium hydroxide, potassium hydroxide or diethanolamine.

The method of adding the pH adjustor is not particularly limited, and the pH adjustor may be added directly or as diluted with water to an optional proportion.

In a case where the polychloroprene latex composition of the present invention is used as an aqueous adhesive, it is preferred to add an adhesion-imparting resin so that characteristics such as initial adhesive force, water resistant adhesive force and adhesion-holding time are more practically balanced.

In a case where an adhesion-imparting resin is blended in the aqueous adhesive, the type is not particularly limited. It may, for example, be a rosin resin, a rosinate resin, a polymerized rosin resin, an α-pinene resin, a β-pinene resin, a terpene phenol resin, a C5 petroleum resin, a C9 petroleum resin, a C5/C9 petroleum resin, a dicyclopentadiene petroleum resin, an alkylphenol resin, a xylene resin, a coumarone resin or a coumarone-indene resin. In order to obtain sufficient initial adhesive force, preferred is a resin having a softening temperature of from 50 to 160° C. Among such resins, an emulsion of a terpene phenol resin or a rosinate resin is particularly preferred in view of initial strength and water resistance.

The method of adding the adhesion-imparting resin is not particularly limited, but it is preferably added in the form of an aqueous emulsion so that the resin is uniformly dispersed in a primer.

Further, as a method of preparing the aqueous emulsion of the adhesion-imparting resin, a method wherein a solution of the adhesion-imparting resin in an organic solvent such as toluene is emulsified/dispersed in water employing an emulsifier, and then the organic solvent is removed by heating while the pressure is reduced, a method wherein the resin is ground into fine particles and then emulsified/dispersed, and the like may be mentioned, and preferred is a method capable of preparing an emulsion comprising finer particles.

The amount (as calculated as solid content) of the adhesion-imparting resin is preferably from 10 to 100 parts by mass, more preferably from 20 to 70 parts by mass, per 100 parts by mass of the solid content of the polychloroprene latex composition. If it is less than 10 parts by mass, adhesive characteristics such as initial adhesive force may not sufficiently be improved, and if it exceeds 100 parts by mass, it is highly possible that the adhesive characteristics such as heat resistant strength are insufficient.

To the polychloroprene latex composition of the present invention, in addition to the above components, a thickener, a metal oxide, a filler, a film-forming aid, an ultraviolet absorber, an antioxidant, a plasticizer, a vulcanizer, a vulcanization accelerator, an antifoaming agent or the like may optionally be added depending upon the performance required.

Further, it may also be used as a two-pack adhesive in combination with a curing agent comprising a polyisocyanate compound or the like.

The metal oxide to be added for imparting stability to or for improving adhesive properties of the latex composition of the present invention, may, for example, be zinc oxide, titanium oxide or ferric oxide, but it is not limited thereto. Use of zinc oxide or titanium oxide is preferred in view of adhesive properties, and use of zinc oxide is particularly preferred. Particularly in a case of a latex having an unsaturated carboxylic acid copolymerized, use of zinc oxide is recommended, which improves heat resistant strength.

The amount of the metal oxide is preferably from 0.2 to 6 parts by mass, more preferably from 0.5 to 5 parts by mass, per 100 parts by mass of the solid content of the polychloroprene latex composition. If it is less than 0.2 part by mass, the effect of improving the adhesive characteristics may be insufficient in some cases, and if it exceeds 6 parts by mass, stickness may be impaired.

The application of the adhesive comprising the latex composition of the present invention is not particularly limited, and the adhesive is suitably used for adhesion of various materials such as cement, mortar, slate, cloth, wood, a synthetic rubber material, a polyurethane material, a polyvinyl chloride material and a polyolefin material.

Now, the effects of the present invention will be explained in detail with reference to Examples and Comparative Examples. However, the present invention is by no means restricted to such specific Examples. In the following description, "part(s)" and "%" are based on mass unless otherwise specified.

EXAMPLE 1

Using a reactor having an internal volume of 3 liter, 0.6 part of a polyvinyl alcohol (PVA 203: manufactured by KURARAY CO., LTD.) and 3.0 parts of a polyoxyethylene alkyl ether (EMULGEN 1118S-70, manufactured by Kao Corporation, HLB value: 16.4) as a nonionic emulsifier were dissolved in 95 parts of water in nitrogen atmosphere at 60° C. This polyvinyl alcohol/nonionic emulsifier aqueous solution was cooled to about room temperature, and 97 parts of a chloroprene monomer, 3 parts of methacrylic acid and 0.3 part of octyl mercaptan were added. While the aqueous solution was kept at 45° C., polymerization was carried out employing sodium sulfite and potassium persulfate as initiators. The system was left to stand further for 1 hour after termination of generation of the polymerization heat, and that point was regarded as the end point of the polymerization. A 20% diethanolamine aqueous solution was added to the obtained polychloroprene latex composition to adjust pH to 7, and the latex composition was concentrated by heating under reduced pressure to prepare samples having solid contents of 50% and 60%.

Measurement of Latex Viscosity

The latexes obtained in Example 1 were adjusted at 25° C., and their viscosity was measured by a Brookfiled viscometer at 30 rpm. The results are shown in Table 1.

Measurement of Agglomerates

The total amount of the polychloroprene latex composition having a solid content of 60% obtained in Example 1 was filtrated through a stainless steel wire mesh with an opening of 177 μm. The residue product was sufficiently washed with distilled water and dried at 110° C., and its mass was measured. The mass of the residue product was divided by the mass of the total amount of the polychloroprene latex composition as shown in the formula (2) to determine the agglomerate content. The result is shown in Table 1.

$$\text{Agglomerate content (\%)} = \{\text{Mass (g) of the residue product}\} \div \{\text{Mass (g) of the entire polychloroprene latex composition}\} \times 100 \quad (2)$$

Mechanical Stability Test

The latex having a solid content of 60% obtained in Example 1 is adjusted at 20° C. and filtrated through a stainless steel wire mesh with an opening of 177 μm to collect resulting agglomerates. The agglomerates are washed with distilled water, dried at 110° C. and weighed. The mass is divided by the mass of the total solid content in the polychloroprene latex composition as shown in the formula (3) to determine mechanical stability. The result is shown in Table 1.

$$\text{Mechanical stability (\%)} = \{\text{Mass (g) of the agglomerates}\} / \{\text{Mass (g) of the total solid content in the polychloroprene latex composition}\} \times 100 \quad (3)$$

Preparation of Adhesive Composition

100 Parts of the polychloroprene latex composition obtained in Example 1, 30 parts of an adhesion-imparting resin emulsion (Tamanol E-100, manufactured by ARAKAWA CHEMICAL INDUSTRIES, LTD.) and 1 part of a zinc oxide dispersion (AZ-SW, manufactured by OSAKI INDUSTRIES CO., LTD.), each as calculated as solid content, were mixed and stirred by a three one motor to prepare an adhesive composition.

Spray Test

An adhesive composition prepared by employing the sample having a solid content of 50% was tested for spray coating. The evaluation of the spray coating was carried out based on the amount of the adhesive coated, uniformity in coating of the adhesive, etc. The result is shown in Table 1. In Table, "favorable" means that the adhesive could be coated uniformly in a sufficient coating amount, and "poor" means that the coating amount was insufficient or uniform coating could not be carried out.

Bonding of Canvas

The above obtained sample was tested for adhesion by brush coating.

The adhesive composition prepared by employing the sample having a solid content of 60% was coated by a brush on each of two pieces of canvas (25×150 mm) in an amount of 300 g (solid content)/m², dried in an atmosphere of 80° C. for 9 minutes and then left to stand at room temperature for 1 minute, and the coated faces were bonded to each other and clamped by a hand roller.

Initial Peel Strength

The bonded canvas was left to stand for 10 minutes, and then 180° peel strength was measured at a tensile rate of 200 mm/min by using a tensile tester.

Normal State Peel Strength

The bonded canvas was left to stand for 7 days, and then 180° peel strength was measured at a tensile rate of 200 mm/min by using a tensile tester.

Water Resistant Strength

The bonded canvas was left to stand for 7 days and immersed in water for 2 days. Immediately after moisture on the surface of the canvas taken out was wiped off, 180° peel strength was measured at a tensile rate of 200 mm/min by using a tensile tester. The following other Examples and Comparative Examples were carried out in the same manner as in the present Example unless otherwise specified.

EXAMPLES 2 AND 3

In the same manner as in Example 1 except that the ratio of the polyvinyl alcohol/the nonionic emulsifier was changed to 1.2/2.4 (Example 2) or 1.8/1.8 (Example 3), latex samples were prepared, which were tested and evaluated.

EXAMPLE 4

In the same manner as in Example 1 except that the nonionic emulsifier was changed to a polyoxyethylene alkyl ether (EMULGEN 1135S-70, manufactured by Kao Corporation, HLB value: 17.9), latex samples were prepared, which were tested and evaluated.

EXAMPLE 5

In the same manner as in Example 1 except that the nonionic emulsifier was changed to a polyoxyethylene alkyl ether (EMULGEN 1108, manufactured by Kao Corporation, HLB value: 13.5), latex samples were prepared, which were tested and evaluated.

EXAMPLES 6 AND 7

In the same manner as in Examples 1 except that the nonionic emulsifier was changed to a polyoxyethylene distyrenated phenyl ether (EMULGEN A-90, manufactured by Kao Corporation, HLB value: 14.5), and that the proportions were as shown in Table 1, latex samples were prepared, which were tested and evaluated.

EXAMPLES 8 AND 9

In the same manner as in Example 1 except that the nonionic emulsifier was changed to an addition product of 2,4,7,9-tetramethyl-5-decyn-4,7-diol and ethylene oxide (SURFYNOL 485, manufactured by Nissin Chemical Industry Co., Ltd., HLB value: 17, ethylene oxide addition mass ratio: 85%), and that the proportions were as shown in Table 1, latex samples were prepared, which were tested and evaluated.

COMPARATIVE EXAMPLE 1

The same experiment as in Example 1 was carried out except that 3.6 parts of the polyvinyl alcohol alone was used instead of 0.6 part of the polyvinyl alcohol and 3.0 parts of the nonionic emulsifier. The results are shown in Table 1. However, since no sample having a solid content of 60% could be obtained, the brush coating test, the initial peel strength test, the normal state peel strength test and the water resistant strength test were carried out employing a sample having a solid content of 50%.

COMPARATIVE EXAMPLE 2

The same experiment as in Example 1 was carried out except that 3.6 parts of the nonionic emulsifier (EMULGEN 1118S-70) alone was used instead of 0.6 part of the polyvinyl alcohol and 3.0 parts of the nonionic emulsifier. However, no polymerization reaction took place even if the amount of the polymerization initiator was increased, and no polychloroprene latex composition could be obtained.

The results obtained in Examples and Comparative Examples are summarized in Table 1. As evident from Table 1, the spray coating was possible and the coating method was not limited in Examples, whereas in Comparative examples, the composition had a too high viscosity, and the spray coating was difficult.

Further, with respect to the adhesive characteristics also, in Examples, strength equal to or higher than that of Comparative Examples was obtained even though the composition had a low viscosity, and the water resistance was rather excellent.

TABLE 1

| | | Examples | | | | | |
| --- | --- | --- | --- | --- | --- | --- | --- |
| | | 1 | 2 | 3 | 4 | 5 | 6 |
| Emulsifier/ dispersant | PVA203 | 0.6 | 1.2 | 1.8 | 0.6 | 0.6 | 0.6 |
| | EMULGEN 1118S-70 | 3.0 | 2.4 | 1.8 | | | |
| | EMULGEN 1135S-70 | | | | 3.0 | | |
| | EMULGEN 1108 | | | | | 3.0 | |
| | EMULGEN A-90 | | | | | | 3.0 |
| | SURFYNOL 485 | | | | | | |
| Evaluation | Solid content 50% | | | | | | |
| | Viscosity (30 rpm) (mPa·s) | 20 | 50 | 120 | 30 | 20 | 30 |
| | Solid content 60% | | | | | | |
| | Viscosity (30 rpm) (mPa·s) | 200 | 550 | 1300 | 280 | 170 | 320 |
| | Agglomerates (%) | <0.01 | <0.01 | <0.01 | <0.01 | 0.08 | 0.22 |
| | Mechanical stability (%) | <0.01 | <0.01 | <0.01 | <0.01 | 0.85 | 1.20 |
| | Spray test | F | F | F | F | F | F |
| | Initial peel strength (N/mm) | 2.5 | 2.4 | 2.5 | 2.5 | 2.4 | 2.5 |

TABLE 1-continued

|  |  |  |  |  |  |  |  |
|---|---|---|---|---|---|---|---|
| Normal state peel strength (N/mm) | 5.1 | 4.9 | 5.2 | 5.1 | 5.0 | 4.9 |  |
| Water resistant strength (N/mm) | 1.65 | 1.15 | 0.32 | 1.55 | 1.40 | 1.45 |  |

|  |  | Examples | | | Comparative Examples | |
|---|---|---|---|---|---|---|
|  |  | 7 | 8 | 9 | 1 | 2 |
| Emulsifier/ dispersant | PVA203 | 1.8 | 1.8 | 3.0 | 3.6 |  |
|  | EMULGEN 1118S-70 |  |  |  |  | 3.6 |
|  | EMULGEN 1135S-70 |  |  |  |  |  |
|  | EMULGEN 1108 |  |  |  |  |  |
|  | EMULGEN A-90 | 1.8 |  |  |  |  |
|  | SURFYNOL 485 |  | 1.8 | 0.6 |  |  |
| Evaluation | Solid content 50% |  |  |  |  |  |
|  | Viscosity (30 rpm) (mPa·s) | 200 | 100 | 300 | 1000 | Polymerization impossible |
|  | Solid content 60% |  |  |  |  |  |
|  | Viscosity (30 rpm) (mPa·s) | 1700 | 1100 | 2700 | Concentration impossible |  |
|  | Agglomerates (%) | 0.02 | <0.01 | <0.01 |  |  |
|  | Mechanical stability (%) | 0.03 | <0.01 | <0.01 |  |  |
|  | Spray test | F | F | F | P |  |
|  | Initial peel strength (N/mm) | 2.5 | 2.4 | 2.6 | 2.4 |  |
|  | Normal state peel strength (N/mm) | 5.0 | 5.0 | 4.9 | 5.0 |  |
|  | Water resistant strength (N/mm) | 0.29 | 0.30 | 0.28 | 0.06 |  |

F: Favorable, P: Poor

INDUSTRIAL APPLICABILITY

The polychloroprene latex composition obtained by the present invention is very suitable as a material for an aqueous adhesion.

The entire disclosures of Japanese Patent Application No. 2003-136182 (filed on May 14, 2003), Japanese Patent Application No. 2003-144332 (filed on May 22, 2003), Japanese Patent Application No. 2004-109691 (filed on Apr. 2, 2004) and Japanese Patent Application No. 2004-121135 (filed on Apr. 16, 2004) including specifications, claims, drawings and summaries are incorporated herein by reference in their entireties.

The invention claimed is:

1. A polychloroprene latex composition obtained by emulsion polymerization of chloroprene alone or chloroprene and a monomer copolymerizable with chloroprene, in the presence of a polyvinyl alcohol and a polyoxyethylene alkyl ether, wherein the mass ratio of the polyvinyl alcohol to the polyoxyethylene alkyl ether is 50/50 to 1/99.

2. The polychloroprene latex composition according to any one of claim 1, wherein the polyoxyethylene alkyl ether has a HLB value of from 14 to 19.

3. The polychloroprene latex composition according to any one of claim 1, wherein the monomer copolymerizable with chloroprene, is an ethylenically unsaturated carboxylic acid.

4. The polychloroprene latex composition according to any one of claim 1, wherein the polyvinyl alcohol is one having a saponification degree of from 60 to 98 mol %.

5. The polychloroprene latex composition according to any one of claim 1, wherein the total amount of the polyvinyl alcohol and the polyoxyethylene alkyl ether is from 1 to 10 parts by mass, per 100 parts by mass of chloroprene alone, or the total amount of chloroprene and the monomer copolymerizable with chloroprene.

6. The polychloroprene latex composition according to any one of claim 1, which has a solid content concentration of from 45 to 75 mass %.

7. The polychloroprene latex composition according to claim 6, which has a pH of from 6 to 9, and a viscosity of from 5 to 5,000 mPa·s.

8. An adhesive employing the polychloroprene latex composition as defined in any one of claim 1.

9. The adhesive according to claim 8, wherein the gel content (toluene-insoluble matter) of a (co)polymer contained in the polychloroprene latex composition is from 3 to 30 mass %.

10. A coating agent employing the polychloroprene latex composition as defined in any one of claim 1.

11. A method for producing the polychloroprene latex composition according to claim 8, which comprises emulsion polymerization of chloroprene alone, or chloroprene and a monomer copolymerizable with chloroprene, in the presence of a polyvinyl alcohol and the polyoxyethylene alkyl ether.

12. An adhesive employing the polychloroprene latex composition as defined in claim 1, wherein the chloroprene is polymerized alone.

13. An adhesive employing the polychloroprene latex composition as defined in claim 1, wherein the chloroprene is polymerized with the monomer copolymerizable with chloroprene.

14. A method for producing a polychloroprene latex composition as defined in claim 11, wherein the polyoxyethylene alkyl ether has a HLB value of from 14 to 19.

15. A method for producing a polychloroprene latex composition as defined in claim 11, wherein the monomer copolymerizable with chloroprene is an ethylenically unsaturated carboxylic acid.

16. A method for producing a polychloroprene latex composition as defined in claim 11, wherein the polyvinyl alcohol has a saponification degree of from 60 to 98 mol %.

17. A method for producing a polychloroprene latex composition as defined in claim 11, wherein the total amount of the polyvinyl alcohol and the polyoxyethylene alkyl ether is from 1 to 10 parts by mass, per 100 parts by mass of chloroprene alone, or the total amount of chloroprene and the monomer copolymerizable with chloroprene.

18. A method for producing a polychloroprene latex composition as defined in claim 11, wherein the chloroprene is polymerized alone.

19. A method for producing a polychloroprene latex composition as defined in claim 11, wherein the chloroprene is polymerized with the monomer copolymerizable with chloroprene.

\* \* \* \* \*